US007635449B2

(12) United States Patent
Bailey, III et al.

(10) Patent No.: US 7,635,449 B2
(45) Date of Patent: Dec. 22, 2009

(54) METHOD OF INHIBITING CORROSION IN HOT WATER SYSTEMS

(75) Inventors: Bruce R. Bailey, III, Tuttle, OK (US); Peter D. Hicks, Aurora, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 11/403,420

(22) Filed: Apr. 12, 2006

(65) Prior Publication Data
US 2006/0182651 A1 Aug. 17, 2006

Related U.S. Application Data

(63) Continuation of application No. 10/718,424, filed on Nov. 20, 2003, now abandoned.

(51) Int. Cl.
*C23F 11/00* (2006.01)
(52) U.S. Cl. .......................................... 422/11; 422/14
(58) Field of Classification Search .................. 252/390
See application file for complete search history.

(56) References Cited

U.S. PATENT DOCUMENTS

| | | | | |
|---|---|---|---|---|
| 4,269,717 | A | * | 5/1981 | Slovinsky .................... 210/750 |
| 4,574,071 | A | | 3/1986 | deSilva et al. |
| 4,775,005 | A | * | 10/1988 | Beyer et al. ............... 165/134.1 |
| 5,236,845 | A | * | 8/1993 | Pierce et al. .................... 436/6 |
| 5,268,092 | A | | 12/1993 | Eden |
| 5,332,494 | A | | 7/1994 | Eden et al. |
| 5,342,510 | A | | 8/1994 | Eden et al. |
| 6,391,256 | B1 | * | 5/2002 | Moon et al. .................... 422/14 |
| 6,402,984 | B1 | * | 6/2002 | Nakajima et al. ........ 252/188.1 |
| 2003/0004681 | A1 | * | 1/2003 | Fandrich et al. ............. 702/183 |

FOREIGN PATENT DOCUMENTS

| | | | |
|---|---|---|---|
| JP | 2003254503 A | * | 9/2003 |
| WO | WO0159535 A1 | * | 8/2001 |

OTHER PUBLICATIONS

Uchino, Yujirou, et al. "Study on the Practical Application of a Method for Corrsion Potential Measurement in a Water Quality Monitoring System Used During Combined Water Treatment." PowerPlant Chemistry, 2001, 3(9), pp. 511-517.*

Shane Filer, "Power Plant Chemistry Measurement Advancements: Oxidation Reduction Potential", Ultrapure Water, pp. 53-62, Nov. 1998.

T.Kh. Margulova, I.V. Zubov, L.V. Kuz'micheva, L.M. Zitivilova, P.N. Nazarenko, "Conditions of dosing oxygen and hydrogen peroxide into the condensate of power units of supercritical parameters (Abstract)", Teploenergetia, 1977.

(Continued)

*Primary Examiner*—Elizabeth L McKane
(74) *Attorney, Agent, or Firm*—Peter A. DiMattia; Michael B. Martin

(57) ABSTRACT

This invention concerns methods and apparatus for measuring oxidation reduction potentials of water in a hot water system at system temperature and pressure and methods of using the measured oxidation-reduction potential to monitor and control the addition of oxygen scavengers or oxygen to the system in order to maintain effective corrosion inhibiting concentrations of the oxygen scavengers or dissolved oxygen in the system.

8 Claims, 9 Drawing Sheets

OTHER PUBLICATIONS

Buecker, B.., "Water Treatment: the Continuing Battle Against FAC", *Power Engineering*, vol. 106, No. 9, Sep. 2002, pp. 32-34.

Dedekind, Irma et al., "Oxygenated Feedwater Treatment at the World's Largest Fossil Fired Power Plant —Beware the Pitfalls —", *Power Plant Chemistry*, vol. 3, No. 11, Nov. 2001.

Haag, J. et al., "On-Line Measurement of Redox and Corrosion Potentials in Water for PWR Steam Generators", *Kraftwerkstechnik, Kraftwerkstechnik GMbH.*, Essen, DE, vol. 70, No. 3, Mar. 1, 1990, pp. 236-241.

Niedrach, Leonard W., "Electrodes for Potential Measurements in Aqueous Systems at High Temperatures and Pressures", *Angewandte Chemie—International Edition*, vol. 26, No. 3, Mar. 1987, pp. 161-169.

Thomas H. Pike and Emery Lange, "An Improved Method for Monitoring Low Concentrations of Volatile Oxygen Scavengers", IWC, Jan. 2008, pp. 64-67.

Barry Dooley, Digby Macdonald and Barry C. Syrett, "ORP —The Real Story for Fossil Plants", PowerPlant Chemistry 2003, 5 (1), pp. 5-15.

* cited by examiner

- ○ ORP measured @110C-Volts; Converted to SHE @ 25°C
- ◇ Low Temperature ORP measure at 25°C
- ■ Dissolved Oxygen — ORP measured against the EPBRE (205°C) and converted to the (SHE 25°C) scale-Volts ORP and Corrosion Map: Sodium Sulfite + Caustic
All potentials are measured against the EPBRE (204°C) mV

METHOD OF INHIBITING CORROSION IN HOT WATER SYSTEMS

CROSS REFERENCE TO RELATED APPLICATIONS

This application is a continuation application of U.S. patent application Ser. No. 10/718,424, which was filed on Nov. 10, 2003 now abandoned.

TECHNICAL FIELD

This invention relates to methods of inhibiting corrosion of metallic surfaces in hot water systems such as industrial boiler systems. More particularly, this invention concerns methods of measuring oxidation reduction potentials of water in the system at system temperature and pressure and methods of using the measured oxidation-reduction potential to maintain and control effective corrosion inhibiting concentrations of oxygen scavengers or dissolved oxygen in the system.

BACKGROUND OF THE INVENTION

The affinity of oxygen for the engineering alloys used in the boiler water industry is the cause of many corrosion phenomena. This is a complex process that not only depends on the amount of oxygen, but also on factors such as the water chemistry and metallurgy. For example, the presence of other species in the water could turn oxygen into an aggressive corrosive force, or could render the metallurgy passivated. Other important factors are temperature, pressure, fluid velocities and operational practices. While oxygen might be the primary or essential component in the corrosion process, it might not be the only one.

The conventional means for reducing oxygen corrosion in water systems is to remove most of the molecular dissolved oxygen by mechanical and chemical means. The vast majority of the dissolved oxygen is reduced into the ppb regime by the use of mechanical deaeration. Here the water is typically heated to above boiling temperature in a vented vessel. The solubility of the dissolved oxygen in this water decreases as the temperature increases. Flow-dynamics and operational issues particular to deaerators leave parts per billion of dissolved oxygen in the water. The chemicals used to reduce the dissolved oxygen values further to reproducibly low and constant values are called oxygen scavengers. Many of these scavengers also function as passivating corrosion inhibitors. Deaerators do not always work perfectly. If they did, a pure scavenger might never be needed, although a chemistry that enhances metal passivation would be a positive addition. So in some cases, the oxygen scavenger is added as an insurance policy against the possibility that the deaerator might malfunction. The scavenger can also be added to combat air in-leakage.

Traditionally, the amount of oxygen scavenger fed to the boiler feedwater has been based on the amount of dissolved oxygen in the feedwater plus some excess amount of scavenger. The amount of excess scavenger fed is based on the desired residual scavenger concentration in the boiler feedwater or boiler water itself, which is a function of the excess concentration of scavenger and boiler cycles. There are several problems with this feed control scheme. The first is that there is no active control of the scavenger feed rate. High oxygen conditions could exist for long periods of time before a decrease in scavenger residual occurs and corrective action is taken. A second issue is that the presence of residual scavenger in the boiler water simply does not mean that the system is being treated satisfactorily. Depending on the conditions (i.e. low temperature or short residence time) it is possible to have both high oxygen concentrations and sufficient scavenger in the feedwater at the same time. When this oxygen rich feedwater reaches the boiler the oxygen is flashed off with the steam leaving the unreacted scavenger in the boiler water. In the extreme case this would result in unacceptably high dissolved oxygen levels in the pre-boiler and condensate systems while having the expected residual concentrations of oxygen scavenger in the boiler itself.

In certain high-pressure boilers (once through) that use ultra-high purity water, a different approach has been taken. No oxygen scavengers are used. In fact small amounts of molecular oxygen are deliberately added to the feedwater. Oxygen, the oxidant, acts as the passivating agent for carbon steel under carefully controlled conditions of boiler water chemistry. Oxygen concentrations used are much less than the air saturated (8 ppm DO) values, thus some deaeration is used. It is often easier to deaerate, to some extent first, prior to adding a controlled amount of oxygen. Accordingly, there is an ongoing need for effective methods for controlling feed of oxygen or oxygen scavengers hot water systems.

SUMMARY OF THE INVENTION

In an aspect, this invention is a method of maintaining an effective corrosion-inhibiting amount of oxygen scavenger or oxygen in a hot water system comprising
(i) determining range of oxidation-reduction potentials for effective corrosion inhibition for the system at system temperature, pressure and pH;
(ii) measuring the oxidation-reduction potential of the water in the system at temperature and pressure; and
(iii) adding oxygen or oxygen scavenger to the system to maintain the oxidation-reduction potential of the water within the predetermined range of oxidation-reduction potentials.

In another aspect, this invention is method of inhibiting corrosion of the metal surfaces of a hot water system comprising
(i) adding an effective corrosion inhibiting amount of oxygen or one or more oxygen scavengers to the system;
(ii) measuring the oxidation-reduction potential of the water in the system at temperature and pressure; and
(iii) adding oxygen or oxygen scavenger to the system to maintain the effective amount of oxygen or oxygen scavengers in the system based on the measured oxidation-reduction potential of the water.

In another aspect, this invention is method of inhibiting corrosion of the metal surfaces of a hot water system comprising
(i) determining range of oxidation-reduction potentials for effective corrosion inhibition for the system at system temperature, pressure and pH;
(ii) adding oxygen or one or more oxygen scavengers to the system to bring the system oxidation-reduction potential within the predetermined range; and
(iii) continuously or intermittently measuring the oxidation-reduction potential of the water in the system; and
(iv) adding oxygen or oxygen scavengers to maintain the measured system oxidation-reduction potential within the predetermined range.

This invention involves controlling the oxygen scavenger feed based on the redox potential of the treated water. Additionally, the redox potential is measured directly in the water at temperature and pressure using a high temperature electrochemical potential monitoring cell. By measuring the redox potential in situ the need for sample conditioning equipment is eliminated. The redox potential of the water is a function of both dissolved oxygen and oxygen scavenger concentrations. By targeting a specific redox potential in the feedwater it should be possible to feed the exact amount of scavenger required to protect a system from oxygen attack. Also, by constant monitoring of the water it is possible to take immediate corrective action when there is a system upset, thus insuring that the system is being properly treated at all times.

DETAILED DESCRIPTION OF THE INVENTION

Figure 1:
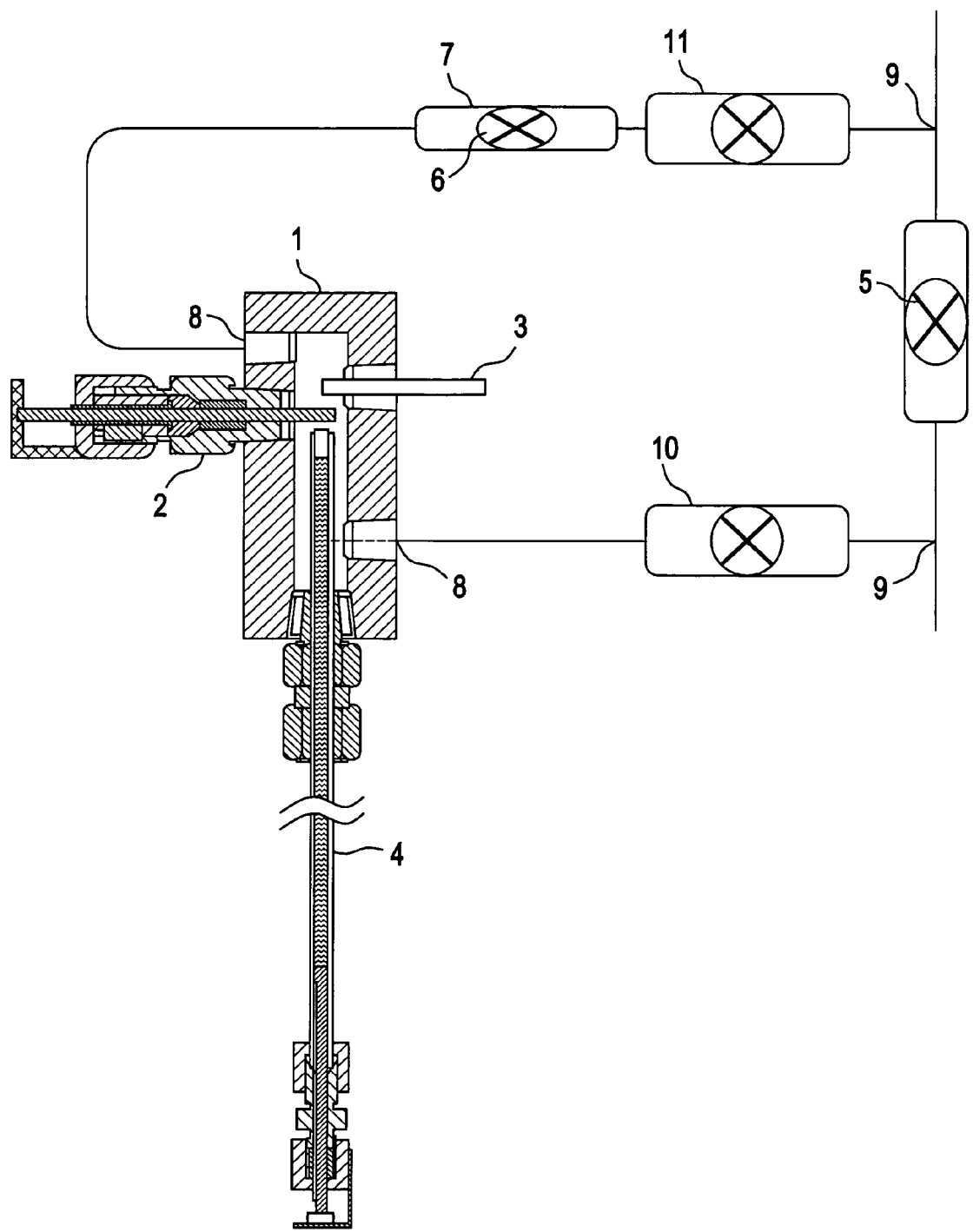
FIG. 1 is a schematic diagram of an oxidation-reduction potential (ORP) measurement cell, shown with platinum electrode assembly 2 and silver/silver chloride reference electrode assembly 4 and thermocouple 3 installed.

Oxygen corrosion is a form of electrochemical corrosion, which is characterized by the anodic oxidation of the metal and the cathodic reduction of molecular oxygen. The anodic or the cathodic reaction, or both, could determine the rate of reaction. When the rate of the cathodic reaction depends on the rate of reduction of the oxygen at the cathode, the overall reaction rate increases with the oxygen concentration. When the overall corrosion rate depends on the rate of the anodic reaction, an increase in oxygen concentration may have no effect or it may actually decrease the overall corrosion rate (as a result of its passivating effect on the anode). Two approaches at controlling corrosion due to oxygen are therefore apparent. They are to reduce the cathodic and/or anodic reaction rate. The cathodic reaction rate can be reduced by the mechanical and chemical removal of dissolved oxygen. Passivation reduces the rate of the anodic reaction. The latter can be achieved via the use of passivating oxygen scavengers, thus affecting both the anodic and cathodic half-cell reactions. However, in the presence of DO, it can also be accomplished without oxygen scavengers.

Oxygen is an oxidizing substance, so it will directly affect the oxidation/reduction potential (ORP) levels in the system.

ORP numbers are measured against a reference electrode and are thus relative numbers, and need to be quoted as such. Usually these measurements will be made against some standard reference electrode, like a silver/silver chloride or copper/copper sulfate electrode. These measurements should be taken under representative conditions of temperature, pressure and flow. Potential values are then converted to the SHE (standard hydrogen electrode) at temperature, scale. Potential data can then be converted to the SHE scale at 25° C. Zero on the latter scale is the standard zero point for electrochemical studies, by convention. There is a potential difference between the zero for the SHE (25° C.) scale and the zero for the SHE scale, at any other temperature, because the standard free energy of formation of hydrogen varies as a function of temperature.

ORP measurements are taken using an ORP cell that is included on a system side-stream or inserted into the process stream itself if high-pressure port fittings are available. The potential of a platinum electrode is measured against an external reference electrode such as a pressure balanced, silver/silver chloride reference electrode. The temperature of the water flowing through the cell is also recorded as a function of time. All data can be recorded at regular intervals on a high input impedance data logger.

Flowrates are chosen so that a representative water sample passes the electrodes. Ideally the conditions found in the electrochemical cell should mirror those found in the bulk water in the system. The sample stream needs to be "fast enough" to ensure chemical homogeneity of the sample with respect to the system at the point of sampling. Cell design needs to be such that streaming potentials are minimized too. Ensuring that the electrochemical cells are made of conducting material, which are well grounded. Large diameter piping for sampling that still maintains rapid linear flowrates will also help limit streaming potentials as compared to small bore tubing in which linear flowrates are excessive. This is particularly important in high purity water.

The importance of measuring ORP at the operating temperatures and pressures of the test environment are immediately obvious: effects of dosing chemicals on the above properties of solutions and materials can be different (and usually are) as the temperature is increased. The effects of upset conditions on these properties ideally need to be evaluated at conditions as close as possible to the actual operating conditions.

The ORP cell would be of such a size as to simulate the flow through conditions (eg. flow rates) of the actual field condition.

The ORP cell should include a stable and reliable reference electrode that does not change its reference potential (relative to the standard hydrogen electrode (SHE)) as the ORP or pH conditions change; and a platinum (or noble metal) electrode that is responsive to changes in the ORP conditions.

A preferred reference electrode is a silver/silver-chloride electrode, filled with potassium chloride (0.1-0.01 normal).

A representative ORP cell 1 is shown in FIG. 1 with a platinum electrode assembly 2, thermocouple 3 and silver/silver chloride electrode assembly 4 installed. The cell is manufactured from a suitable material such as AISI type 316 stainless steel. The cell has been designed so that the electrodes are in close proximity to one another. This will reduce uncompensated resistance effects that exist in low conductivity water environments. FIG. 1 shows the cell in a flow through arrangement with several high-temperature (up to 370° C.) and pressure rated (up to 27.6 MPa; 4000 psi) valves which can be used to isolate the ORP cell from any flow loop. The cell and valve unit can be incorporated onto any flow through system. Essentially the main flow line will be through valve 5, with valves 10 and 11 closed and the cell not in operation. Water can be forced through the cell by firstly opening valves 10 and 11, followed by closing valve 5. At this stage all of the required electrode potential monitoring can be performed.

The tests performed in the ORP cell can be carried out without affecting the main flow through loop. That is, at any stage valve 5 can be opened and then valves 10 and 11 can be closed. The bleed valve 6 can be opened to vent the ORP cell and once the cell has cooled down, any part of the cell may be disassembled/replaced or refurbished. For example a new platinum electrode could be installed and fresh KCl filling solution can be inserted into the Ag/AgCl reference electrode. This can therefore be done without affecting the main flow through loop. The cell can be placed on normal sample points of boiler circuitry and thus any oxygen ingress into the flow loop once an ORP cell is brought back into service, is of little consequence. When this is not the case, a second bleed valve (not shown) can be installed adjacent to valve 10 so that inert gas can be purged through the cell before flowing water through the cell. The cell can also be placed on any side stream or exit loop and the water flowing through the cell can be discarded to drain.

In the ORP cell shown in FIG. 1 there are four distinct items (excluding the ORP cell itself): two thermocouples, one EPBRE (external pressure balanced reference electrode) and one platinum probe. The ORP is merely the potential difference recorded between the EPBRE and the platinum probe. The thermocouples are used to measure the temperature of the cell and the cold junction temperature of the reference electrode itself.

There could be any number of ways to obtain the same signal, but the basic premise is that the ORP is measured at temperature and pressure, in a flowing water stream.

The manufacture of a representative ORP cell as shown in FIG. 1 is described below. The representative ORP cell described below is designed to operate at temperatures up to 300° C. and can be used safely at pressures of up to 13.8 MPa (2000 psi; 1380 bar). Typically the lower temperature of operation will coincide with system conditions. For example a deaerator (used primarily for the mechanical removal of dissolved oxygen) could operate in the 100-125° C. regime at pressures up to 340 kPa.

The following items are used to manufacture the ORP cell shown in FIG. 1: ORP cell body 1 (electrode body from 1½" hex type 316 SS stock, 7/16" central bored hole with threaded connectors to take ¼" NPT fittings, High Pressure Equipment Co., Erie, Pa.), J-Type thermocouple 3 (⅛" OD, sheath thermocouple, 304 SS, iron constantan, J-type, 6" in length, 0.125" sheath diameter, Omega Engineering, Inc., Stanford, Conn.), Swagelok® valves 5, 10 and 46 (UG series bellows sealed valves ⅜" Swagelok® tube connectors CAT# SS-6UG, Dearborn Valve & Fitting Co., Wauconda, Ill.), Bleed valve 6 ("BV" series bleed valve with stainless steel barhandle+barbed vent tube CAT# SS-BVM-4-C3-SH, Dearborn Valve & Fitting Co., Wauconda, Ill.), Female branch tee 7 (CAT# SS-600-3TTF, Dearborn Valve & Fitting Co., Wauconda, Ill.), Male connectors 8 (MSC male connector; CAT# 6MSC4N, Instrument Associates, Inc., Alsip, Ill.), Union tee-s 9 (CAT# SS-600-3, Dearborn Valve & Fitting Co., Wauconda, Ill.).

Stainless steel tubing (⅜" OD AISI type 316) is used to connect the above items as shown in FIG. 1. The entire cell and parts can be assembled from different sized tubing if required. The bleed valve 6 attaches to the female branch tee 7. Only once the cell has been assembled and installed on site, is it heat-insulated for temperature control and safety reasons.

Figure 2:
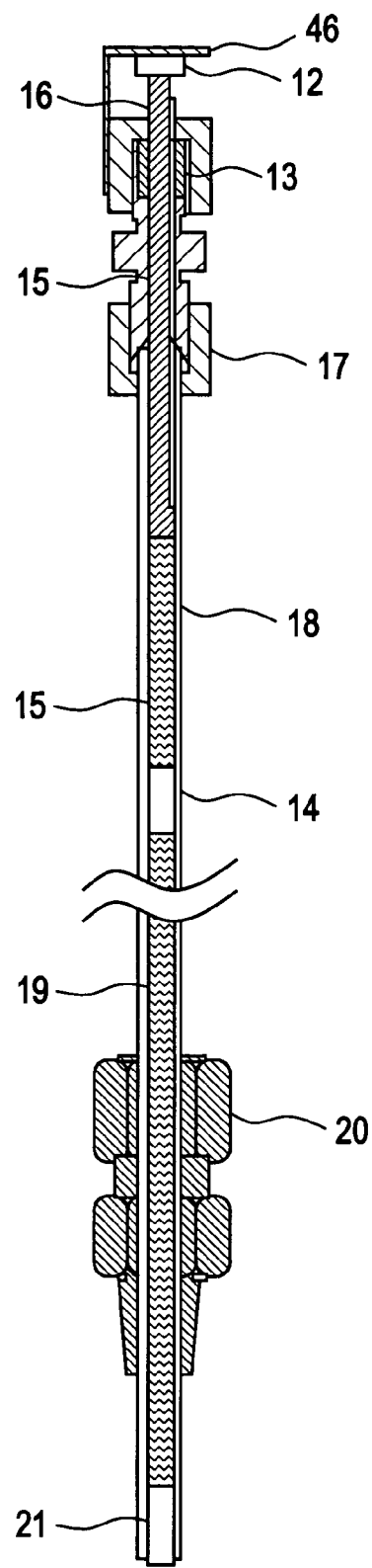
FIG. 2 is a schematic diagram of a Silver/Silver Chloride reference electrode assembly.

The manufacture of a representative silver/silver chloride external pressure balanced reference electrode (EPBRE) as shown in FIG. 2 for attachment to the ORP cell is described below.

The following items are used to manufacture the silver/silver chloride EPBRE: pressure retaining cap 46, Teflon® insulator 12 (teflon® round bar, 24", Part# 2RT-8, Small Parts, Inc.; Miami Lakes, Fla.), Teflon® ferrule 13 for 3/16" pipe fitting (CAT# 3TZ-T Instrument Associates, Inc.; Alsip, Ill.), teflon® insert 14 (Teflon® tubing 0.125" OD, 1/16" ID; CAT# L-06407-42, Cole Parmer Instruments Co., Chicago, Ill.), heat shrink Teflon® 15 (¼" OD Expanded; CAT# N-06851-20 Cole Parmer Instruments Co., Chicago, Ill.), silver rod 16 (3.2 mm diameter, 99.99%; CAT# 34,877-5 Aldrich Chemical Company, Inc., Milwaukee, Wis.), stainless steel fitting 17 (PARKER fitting, CAT# 4RU2, Instrument Associates, Inc., Alsip, Ill.), ¼" OD stainless steel tube 18 (0.028" wall), 0.1 N KCl electrolyte 19, high pressure fitting 20 (bored through ¼" tube fitting ¼ NPT fitting (male connector), CAT# SS-400-1-4-BT, Dearborn Valve & Fitting Co., Wauconda, Ill.), porous, core-drilled, zirconia frits 21 for a silver/silver chloride electrode (approx. dimensions ⅛" OD and about 15 mm in length, Materials Engineering Associates, Lanham, Md.).

Step 1. Preparation of the Silver Rod.

a. Cut the silver rod 16 (dimensions: 7 cm long with 4.5 cm of that being the tapered end, which goes from ⅛" diameter to a point (0"). File to a tapered end. Grind through a series of grit papers i.e., from 120/240/400/600.

b. Prepare a 1N HCl solution.

c. Chlorodizing process.

Set-up in a 1 liter glass cell about 1 liter of 1N HCl, no reference electrode is required; two carbon counter electrodes connected together will serve as the counter electrode (to be connected to a Potentiostat counter electrode lead). The working electrode (green lead) is the silver rod, which is left dangling in the center of the glass cell. Both counter electrodes are 180 degrees apart at the edge of the glass cell. The silver (working electrode) is in the center of the two counter electrodes. A typical potentiostat setup is: EG&G 273 Potentiostat: Current range=100 mA, mode=galvanostat; Set scan setup: $I1=0$ A; delay $1=10$ s; scan $1=1$ mA/s; $I2=-8.3$ mA (feed in as 0.083-mA); delay 2=6500; scan $2=10$ s; $I3=0$ A. Now press start once the cell has been activated. Store the chlorodized electrodes in a 0.1N KCl electrode filling solution after chlorodizing.

Step 2. Assembling the Ag/AgCl Electrode.

a. Drill out the stainless steel fitting 17 so that the silver rod 16 and heat shrink Teflon® 15 will be able to pass through the unit. The fitting is a reducing union. The one end takes a ¼" tube and the other end a ⅛" inch tube. The drill size to be used is an ¹¹⁄₆₄" drill bit. After drilling, ultrasonically clean in acetone.

b. The fitting to be used to pass the ¼" stainless tube 18 into the autoclave is a ¼" NPT stainless steel fitting 20. Connect this fitting to the bottom of ORP cell 1. The stainless steel tube, used in this work is, 15½" long. Remove any burs and restore the tube ends to their original pipe thickness.

c. The small piece Teflon® insert 14 (not heat shrink) is drilled out in the center with a ⁵⁄₆₄" drill bit, to give an approximate length of 3 cm. Then clean with acetone.

d. One end of the long piece of Teflon® 15 (2:1 HST from ¼" to ⅛")) is to be heat shrunk over the frit 21. The frit 21 has a 3.2 mm diameter and is approximately 14 mm long. The other half of the heat shrink Teflon® is shrunk over the small, 3 cm, Teflon® insert 14. Make sure that both pieces of the Teflon® (including the 3 cm Teflon® insert) are heated to the transparent state. This will ensure that they are bonded together when they cool to their opaque state. Heat shrink about 29 cm of this tubing onto the frit 21 and Teflon® insert 14. Then make sure to straighten the Teflon® (reheat to a transparent state may be necessary).

e. Pressure relief caps: A stainless steel band clamp should be welded over the ¼ inch stainless steel fitting 17 to prevent the silver rod from being ejected under pressure. Cut out small pieces of Teflon® sheet (Teflon® sheet, 6"×6"; Part# VT-125, Small Parts, Inc.; Miami Lakes, Fla.) and use insulation tape to tape these pieces to the inside of the stainless steel cap 47, to complete the insulation step.

f. Heat shrink the final piece of ¼-⅛" Teflon® tubing 15 to the desired length, making sure that the end piece is heat shrunk over an approx. ⅛" rod. It is in this end that the tapered, chloridized silver rod section is coerced. Leave about ⅜" of silver sticking out of the end as the electrical connection point.

g. Slip on the Teflon(& ferrule 13 and tighten up the fitting 17.

h. Use a long hypodermic needle to fill both portions of ⅛" OD heat shrink Teflon® with 0.1 N KCl.

i. Apply a small amount of vacuum grease to the exposed Teflon® Insert 14 to make separation of the electrode after use, prior to refilling easier.

j. Slide the heat shrink Teflon® ⅛" OD, that contains the silver rod 16, over the Teflon® Insert 14.

k. Measure the rest potential of the electrode filled with 0.1N KCl 19 against a saturated KCl//AgCl/Ag electrode in a beaker of saturated KCl at 25° C. The rest potential should be +90 mV (±2 mV).

The manufacture of a representative platinum electrode assembly 2 with a pressure retaining cap is described below.

The following items are used to manufacture the platinum electrode: Teflon® retaining cap 22 (Teflon® round bar, 24"; Part# 2RT-8, Small Parts, Inc., Miami Lakes, Fla.), Conax® Fitting (TG-14-AT, Patrick and Douglass, Inc., Lombard, Ill.) consisting of stainless steel follower 23, Stainless Steel Guide 24, ceramic Insulator 25(2), Teflon® seal 26, and stainless steel fitting 27, heat shrink Teflon® 28 (1 layer J-SM2T-20-36, Small Parts, Inc., Miami Lakes, Fla.), platinum wire 29 (1.5 mm diameter, 99.9%; CAT# 34,939-9, Aldrich Chemical Company, Inc., Milwaukee, Wis.), Stainless steel washer 30, Teflon® insulated metal wire 31.

Figure 3:
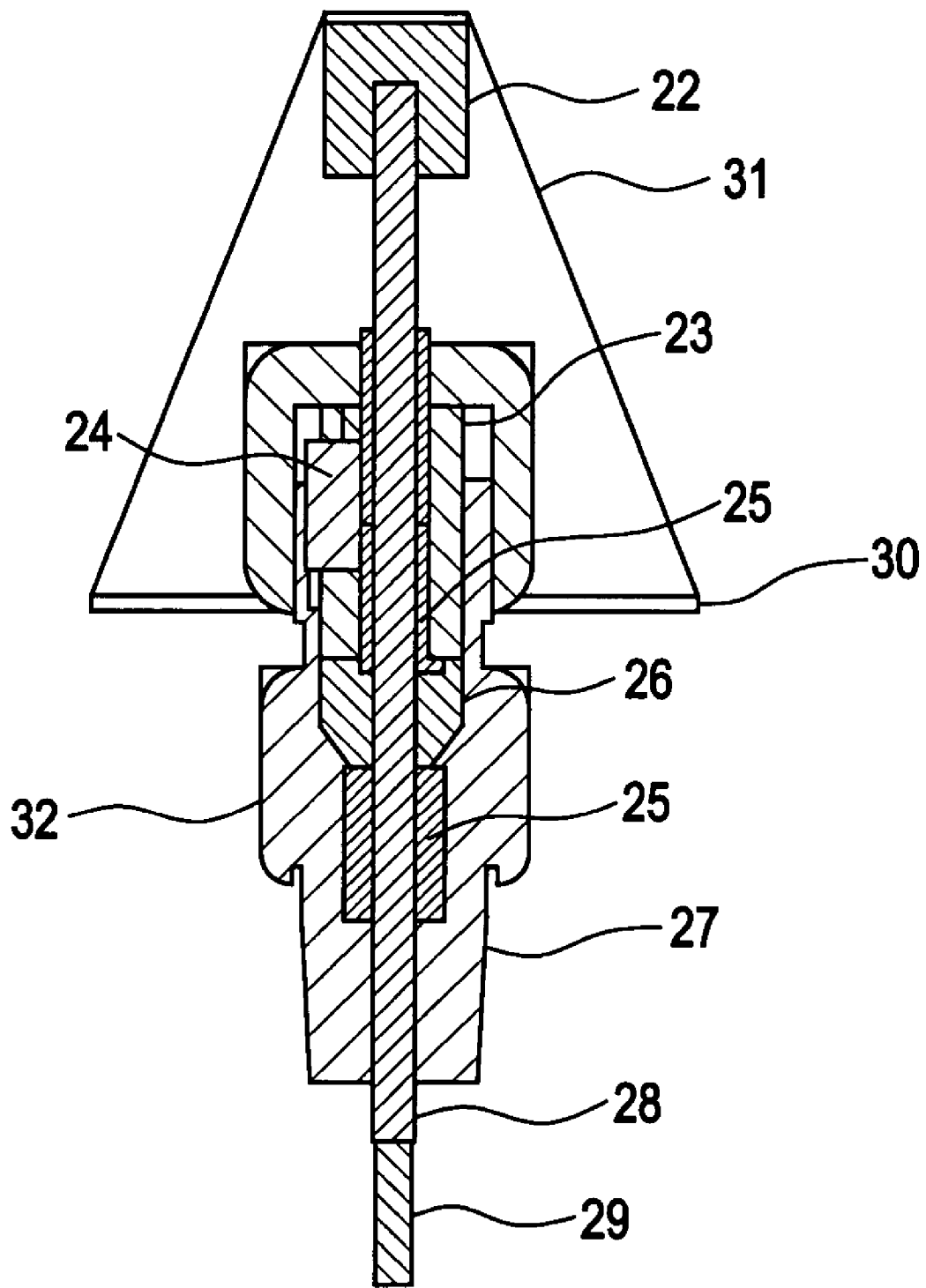
FIG. 3 is a schematic diagram of a platinum probe assembly.

Assembly of the platinum electrode.

a. Straighten platinum wire 29 and make sure length is approximately 10 cm.

b. Drill four holes in the stainless steel washer 30 90° apart and 2 mm in from the outside edge, using a ⁵⁄₆₄" drill bit. The washer should have an ID of 17.4 mm and an OD of 38 mm.

c. Teflon® cap 22. Cut an 11 mm long piece of Teflon® from a ½" diameter rod and drill a hole at the center of one of the flat ends ⅓ of the way through with a ⁵⁄₆₄" drill bit. This hole will act as an anchor point for the Pt wire. On the other side of the Teflon® cut two perpendicular lines crossing in the middle and approximately 1-2 mm deep with a hacksaw. These groves will act as anchor points for the wires that secure the Teflon® insulator.

d. The Teflon® seal 26 comes with the EG Gland, increase the hole size with a ⁵⁄₆₄" drill bit.

e. Cut a section of heat shrink Teflon® 28 about 7 cm long. Clean the platinum wire with acetone then ethanol. Slide the Teflon® on the Pt wire leaving one 1 cm exposed on one end. Heat the Teflon® with a heat gun until the Teflon® is transparent.

f. Assemble the electrode body 32 as shown in FIG. 3. The tip exposed to solution should stick out 15 mm from the end of the Conax® fitting and finger tighten the assembly. Tighten to <15 ft lbs to maintain sealing. The seal will be pressure tested cold. If it leaks it may be tightened a bit more.

g. Cut 4 pieces of stainless steel wire approximately 24 cm long with a 0.8 mm OD and then fold them in half.

h. Place the folded wire through the holes on the washer 30 with the folded end towards the back of the Conax® gland.

i. Place 4½ cm of ⅛" OD Teflon® tubing over each folded wire to ensure that the alligator clip (used for electrical connection to this platinum probe) is not electrically connected to the wire.

j. Place the Teflon® cap 22 on platinum wire 29 (drilled hole inserted over the Pt wire) and fold the wires over the top, into the groves cut earlier.

k. Wrap the end of the wires around the top of the Teflon® insulator, in order to attach the insulator firmly to the top of the Pt wire. This is to prevent the Pt wire from slipping out of the Conax® fitting, as a result of the internal pressure in the ECP cell 1.

l. Wrap Teflon® tape around the top to cover the exposed stainless steel wires.

The at-temperature ORP measured using the ORP cell described above is the potential difference that exists between the reference electrode and the platinum electrode. The measurement is accomplished by attaching an electrical wire to the exposed (open to atmosphere) platinum wire of the platinum electrode and running the wire to the positive terminal (often red wire) of a voltage measuring device. Another wire is attached to the exposed silver portion of the reference electrode and run to the negative terminal (often black wire) of the voltage measuring device. Any suitable connection device, for example alligator clips, can be used to attach the wires to the platinum and silver electrodes as long as electrical continuity and isolation is ensured. Alternatively, the wires can be soldered to the platinum and silver portions of the electrodes.

Unlike pH probes, ORP probes need not be calibrated but it is good practice to verify that the probes are functioning appropriately. There are various ORP standards that can be obtained from vendors for ORP probe calibration. However, the most economical and best way to obtain a fresh standard is to make them up from their basic constituents. There is an ASTM standard D 1498-93 that contains a recipe for making up ORP standards.

For the high temperature ORP probes the potential difference between the EPBRE reference electrode and a saturated KCl//AgCl/Ag electrode can be made in a saturated KCl solution. The potential difference is always 88-92 mV. This is because 0.1N KCl is used in the EPBRE and not saturated KCl.

The data generated using the ORP cell as described herein can be logged by any number of commercially available instruments, one example being a model 2001/MEM2 high performance digital multi-meter (DMM) data logger with 128 K memory and 8605 test leads, available with a TC scan card (Keithley Instruments, Arlington Heights, Ill.).

The temperature of the cold junction of the EPBRE can be monitored by attaching one end of a thermocouple to the exterior base of the EPBRE. For purposes of the experiments described herein, one end of a J-type, fine gauge, unmounted, bare thermocouple probe (5 ft straight cable) CAT# G-08505-87 (Cole-Parmer Instrument Company; Niles, Ill.) is taped to the exterior of the base of the EPBRE. This region is typically at ambient temperature.

With the use of a high input impedance data logger, a Quick Basic downloading program and a data graphing package (like Microsoft Excel or Synergy Systems Kaleidagraph product (amongst others)) an entire ORP signature profile can be obtained in high pressure and temperature aqueous environments. The final output is a plot of ORP potentials as a function of time and cell temperature.

The conversion of measured electrode potentials measured with the silver-silver chloride reference electrode to the standard hydrogen electrode scale at the test temperature and at 25° C. is described below (SHE is at 0V at 25° C., by convention).

The Ag/AgCl electrode described herein has the tip of the filling solution (about the zirconia frit 21) at the test temperature, while the electrolyte at the active Ag/AgCl tip is essentially at room temperature (taken as 25° C.). The potential for the half-cell reaction needs to be known:

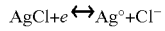

This requires a knowledge of:
(1) The potential (E°) of the Ag/AgCl half cell on the SHE scale at temperature;
(2) The potential $E_{th}$ (thermal potential) of the Ag/AgCl thermal cell where one cell is at temperature and the other is at ambient temperature
(3) The activity coefficients of KCl at elevated temperatures
(4) The conversion for the corrected hydrogen scale reaction

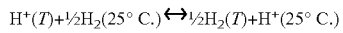

Much of the above information is tabulated in the literature and just needs to be graphed and put in equation form. The data given below is for a 0.1N KCl electrode filling solution (all temperatures are in degrees Celsius).

To convert an ORP measured against the EPBRE(T) to the SHE(T), where c2=water sample temperature(° C.), c7=ambient temperature (° C.) (this is the base temperature of the EPBRE), and c5=the ORP measured on platinum against the EPBRE in Volts, in the above ORP cell at temperature:

$E(SHE(T))$ in volts=c5+0.2371−(0.5226e-3)c2−
(2.4713e-6)c2^2−(1.9844e-4)(c2+273.15)log
(0.0777−2.023e-5c2−9.810e-8c2^2−4.368e-
10c2^3)−9.015e-4(c2-c7)+5.524e-6(c2^2-c7^2)−
1.746e-8(c2^3-c7^3)+2.346e-11(c2^4-c7^4)

Then to convert from the SHE scale at temperature to the SHE (25° C.) scale:

$E(SHE(25° C.))=E(SHE(T))$−2.344e-2+9.821e-4c2−
1.771e-6c2^2−1.672e-10c2^3.

So, for example, if the cell temperature is 206.2 (° C.); the temperature about the base of the EPBRE is 25.1 (° C.); and the potential of platinum versus the EPBRE (this is the ORP) is measured as −0.3265 V, then: The ORP versus the EPBRE (T) is −0.3265V, the ORP versus the SHE(T) is calculated to be −0.2319 V and the ORP versus the SHE(25° C.) is calculated to be −0.1296 V.

The measured ORP is used to control the amount of oxygen scavengers or oxidant (oxygen) needed to be fed to a hot water system for corrosion control. The control scheme can incorporate pump limiters, alarming, and intelligent control, based off further inputs like pH, dissolved oxygen and other water constituents.

As used herein, "hot water system" means any system where hot water is in contact with metallic surfaces. "Hot water" means water having a temperature of about 100° F. to up to about 700° F. The hot water system may operate at atmospheric pressure or a pressure of up to about 3,000 psi. A preferred hot water system is an industrial boiler system. By way of example, boiler feedwater typically has a temperature of about 200° F. to about 400° F.

Oxygen corrosion may occur in any part of a steam generating system. Its nature and severity may vary depending on the source of the dissolved oxygen, pressure, temperature, water chemistry, flow conditions, and metallurgy. The attack occurs at any weak point in the protective film and sharp edged pits form with tubercle caps. It is the objective of oxygen corrosion control to prevent DO corrosion in all parts of the system. It is, therefore, imperative to consider where oxygen might enter the system and how to choose feed points for oxygen scavengers for optimum effectiveness. The major oxygen source is often the feedwater. Single stage vacuum deaerators might not decrease DO values much below 100 ppb, whereas the more efficient deaerating heaters might reduce DO values to about 7 ppb.

Unless reduced by oxygen scavengers, the DO is carried through the remainder of the system where it may corrode feedwater preheaters and economizers. Since the DO cannot escape with the steam prior to the water boiling regimes, the preboiler regions are more predisposed to oxygen attack. Within the preboiler, attack is going to be most severe in areas where the heat flux and temperatures are the highest. This means that attack is most likely in the economizer regions. Since attack takes on the form of pitting, corrosion can be rather rapid. To prevent these types of failures, the oxygen scavenger is often added to the feedwater storage tank or the storage section of the deaerating heaters.

Other sources of oxygen "in-leakage" might include the suction side of the feedwater pumps, seals, the condensers, the cross over regions between the high and low pressure turbine stages. Copper and certain copper containing alloys are particularly sensitive to oxygen ingress, in the presence of ammonia.

All oxygen scavengers are by definition reducing agents (reductants) although not all reducing agents are necessarily oxygen scavengers. Reducing agents, suitable as oxygen scavengers, satisfy the thermodynamic requirements that an exothermic heat of reaction exists with oxygen. For practical applications, reasonable reactivity is required at low temperatures. That is, there should be some favorable kinetics. This condition is often not satisfied by many of the oxygen scavengers. It is also highly desirable that the reducing agent and its oxidation products are not corrosive and do not form products that are corrosive when they form in steam generating equipment. All oxygen scavengers function optimally with regard to certain pH ranges, temperature and pressure, and are affected by catalysis in one way or another. The selection of the proper oxygen scavengers for a given system can be readily determined based on the criteria discussed above.

Preferred oxygen scavengers include hydrazine, sulfite, carbohyrazide, N,N-diethylhydroxylamine, hydroquinone, erythorbate, methyl ethyl ketoxime, hydroxylamine, tartronic acid, ethoxyquin, methyltetrazone, tetramethylphenylenediamine, semi-carbazides, DEAE 2-ketogluconate, N-isopropylhydroxylamine, ascorbic acid, gallic acid and hydroxyacetone.

Oxygen corrosion may also be inhibited in certain hot water systems by passivation. Passivation is a form of corrosion inhibition in which barriers of insoluble, non-porous materials are generated on the metal surface as a result of chemical reactions between metal ions and ionic or other chemical species in the aqueous medium. When the chemical system allows for insoluble barriers to be set up this way, passivation is possible. However, when it does not, passivation is not possible, and corrosion control needs to be via cathodic inhibition, rather than anodic inhibition. In most steam generating systems, the anodic passivation comes from the formation of a magnetite layer ($Fe_3O_4$). Descriptions of the passivating layer in boilers have ranged from dark black to gunmetal gray to grayish-blue in coloration. The layer is magnetite; and apart from this layer, the boiler tubes are completely free of any corrosion.

Oxidants such as molecular oxygen accelerate magnetite formation when added to the iron water system in carefully controlled amounts. This is the basis for oxygenated boiler water treatments. The success of this approach lies in the strict control of the ion content of the feedwater, which must be highly deionized. The intent is to add dissolved oxygen, which converts magnetite to ferric oxide hydrate (FeOOH), which has a lower solubility than the magnetite.

The ORP can also be measured in boiler water (boiler blowdown) and condensate. Condensate is often a region where oxygen in-leakage can pose a significant corrosion problem.

The ORP potential of the feedwater is a function of both dissolved oxygen and oxygen scavenger concentrations. In principle by targeting a specific ORP potential in the feedwater it is possible to feed the exact amount of scavenger required to protect a system (often carbon steel metallurgical alloys) from oxygen attack and provide adequate passivation and corrosion inhibition.

One of the key advantages of this concept is that by constantly monitoring the feedwater it is possible to take immediate corrective action when there is a system upset. Thus ensuring that the entire boiler system is being properly treated at all times. There could also be situations where excess scavenger might be fed (in the case of passivating oxygen scavengers) in order to not only control dissolved oxygen values but also to reduce system corrosion rates.

It is possible to measure real time dissolved oxygen values and real time oxygen scavenger residuals however this is expensive, complicated, and in some cases cannot be done currently. Inferences about corrosion rates of engineering alloys still need to be made.

Under the ORP based control scheme described herein, alarms could alert the boiler operators to malfunctioning deaerators. For example where ORP potentials cannot be brought under control with additional scavenger feed there would be a time-out alarm. Also if too much scavenger is being pumped, control logic could alert operators. Sophisticated control schemes could include pH, dissolved oxygen (DO), ORP and scavenger residual signals for full diagnostic control of preboiler operations.

In order to employ an ORP control scheme it is important to understand individual scavenger responses at temperature, as scavengers vary in reducing power. Implications and ramifications of ORP control philosophies as they pertain to system corrosion also needs to be known.

Figure 4:
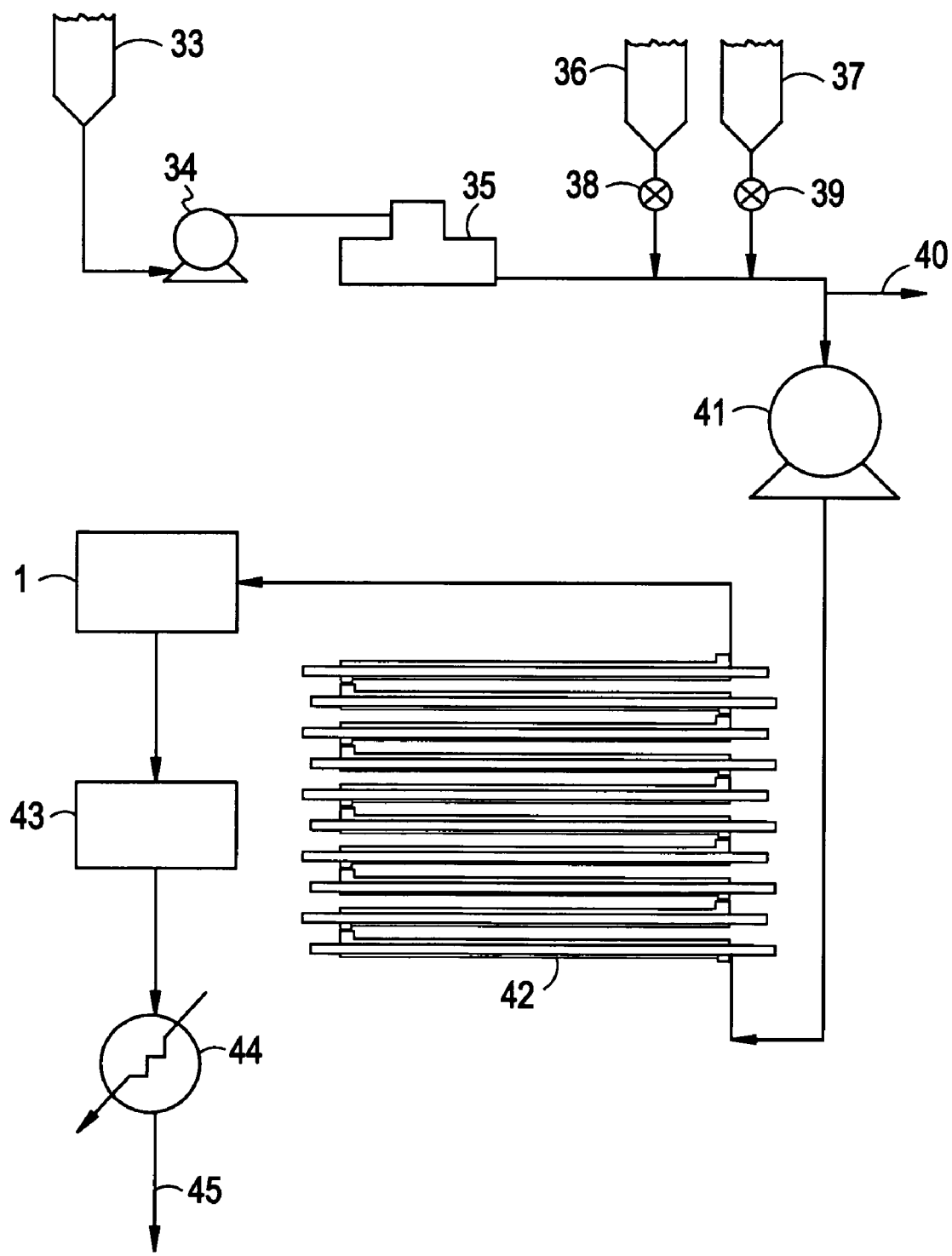
FIG. 4 is a schematic diagram of a test rig used to study control of oxidant or reductant feed based on oxidation-reduction potential of the treated water.

A test rig used during the ORP studies described below is shown in FIG. 4. Typically deionized water 33 is fed to a tray type deaerator 35 using pump 34 where dissolved oxygen is mechanically removed. Caustic solution 36 and/or oxygen scavenger solution 37 can then be fed to the dearated water through valves 38 and 39, respectively. Alternatively, oxygen scavenger can be added directly to the deaerator. For the studies described herein, the pH is controlled at about 9.2 by caustic addition. Throughout this testing sequence the rig flowrate is 440 ml/min.

Water is then fed by main feedpump 41 to 10 heat exchangers 42 where water can be heated to any temperature. Pressures are such that boiling is prevented. This simulates preboiler environments (to after the economizer in typical boilers). In this series of tests the pressure is 800 psi and water temperatures exiting the heat exchanger rack are typically about 205° C. If desired, water samples may be removed from inlet sample point 40 for analysis as described below for water samples taken at sample section 45.

During the ORP testing sequences, further dosing applications can be made after the heat exchanger rack. There is enough flexibility that oxygen and/or scavenger (reductant) can be fed just prior to the high temperature ORP cell 1, which incorporates the platinum and reference electrode for ORP measurement.

Where oxygen is purposefully added to the water it is added as either air saturated water or oxygen saturated water. The location of oxygen dosing is either just after the deaerator or just prior to the high temperature ECP cell.

A high temperature corrosion cell 43 is installed after the ORP cell to perform general and localized corrosion testing. After the water is depressurized and cooled in cooler 44 it is passed through a sample section 45. In the sample section there are several pieces of analytical equipment. These included a dissolved oxygen meter, room temperature ORP probes, conductivity probe and pH probe. Use of the ORP cell and test rig described above for measuring the effect of dissolved oxygen and oxygen scavenger (reductant) concentrations on ORP response and use of ORP to control oxygen scavenger feed in hot water systems is described in the following examples.

EXAMPLE 1

Comparison of High and Low Temperature ORP Probe Responses to Changes in Reductant and Dissolved Oxygen Concentration.

Figure 5:
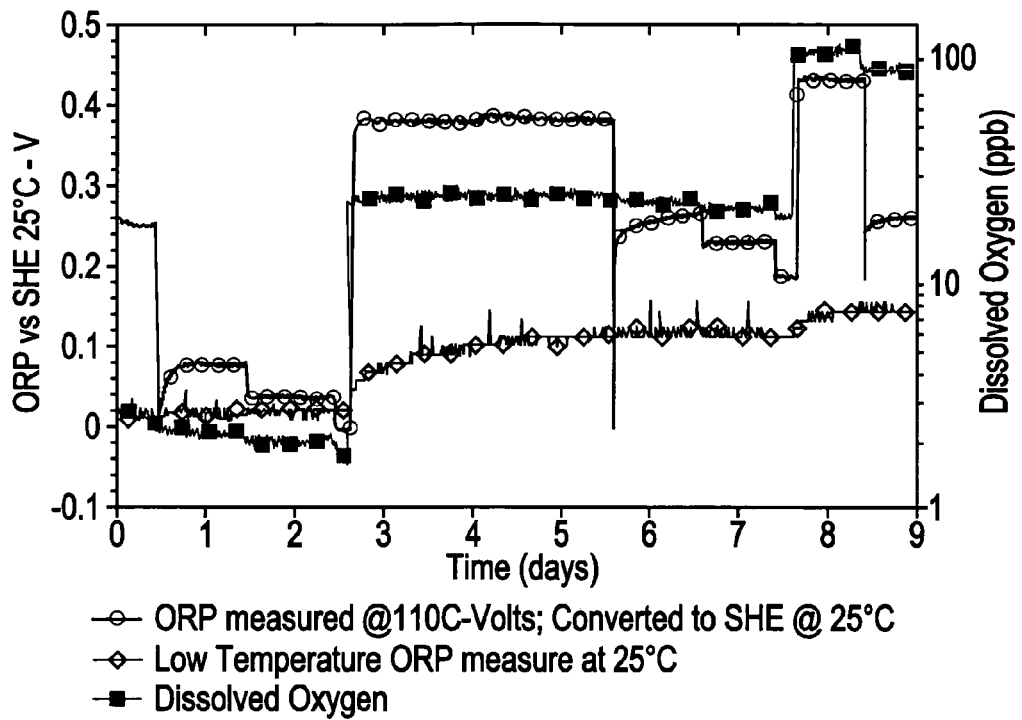
FIG. 5 is a plot of high temperature ORP probe responses and low temperature ORP probe responses against reductant (erythorbic acid) and dissolved oxygen concentration.

FIG. 5 shows a series of tests that compares the performance of room temperature (low temperature) ORP probes with the high temperature ORP probe of this invention using the test rig described above. The figure shows two ORP measurements that are made for different dissolved oxygen and erythorbic acid additions. The dissolved oxygen values are plotted on the right hand Y scale. The X axis is time in days. Step changes in the high temperature (110° C.) ORP probe response correspond to when changes are made in the erythorbic acid concentration or dissolved oxygen values. The only changes seen by the low temperature ORP probe correspond to when macro changes are made to the dissolved oxygen values. As can be seen, the low temperature ORP probe does not respond to the changing reductant additions (erythorbic acid in this case).

FIG. 5 also shows how the high temperature ORP probe responds to excess scavenger feed, while the low temperature ORP probe only responds to dissolved oxygen values. The low temperature ORP probe response is also sluggish as compared to the high temperature ORP probe responses. It should also be noted that the relative changes in response of the low temperature ORP probe are much smaller than those seen by the high temperature ORP probe.

The low temperature ORP probe is also seen to be slightly more responsive to oxygen increases than it is to oxygen decreases, showing a hysteresis in response. In addition, there are cases where true ORP changes are not picked up by the low temperature ORP probe, and if they are picked up the ORP number measured moves very slowly and the magnitude of the move is small.

Various factors including temperature, pH, dissolved oxygen concentration, and the presence of oxygen scavengers in the system must be taken into account in any ORP based control scheme. These factors are discussed in detail below.

EXAMPLE 2

Effect of Temperature and pH on ORP Measurement.

It is important to note that the temperature of ORP measurement is critical in determining the ORP value to be achieved. For example, decreasing the temperature from 204° C. to 121° C. in a pH (room temperature) of 9.2 (caustic adjusted) water environment will raise the ORP by several hundred millivolts as measured against the EPBRE (T). This is a direct result of the effect of temperature on the factors in the Nernst Equation. Increasing temperature lowers ORP numbers.

The Nernst Equation states that: $E=E_o-(RT/zF)\ln([oxid]^o/[reductant]^r)$

Therefore, the temperature will affect the potential measured (E) directly and proportionately. As the temperature increases, the potential should decrease (become more negative). Temperature not only affects the "T" term in the above equation, but it can also affect the "z" term (number of electrons transferred) and the oxidation and reductant concentrations, and thus the logarithm term above too. This is why ORP probes are not usually compensated for temperature effects.

Typically for the case of the high temperature ORP probe, for every 1° C. increase, the ORP decreases by about 2.6 mV. The magnitude of this change, and its importance, will need to be assessed with respect to any control range for ORP, if and when the temperature of the water flowing through the ORP probe changes.

It is known that pH affects ORP as well. It is expected that ORP will decrease as pH increases and the relative magnitude of this change is about 55-65 mV for every one-unit increase in room temperature pH. This response also tends to be linear.

EXAMPLE 3

Effect of Dissolved Oxygen and Oxygen Scavenger Concentration on ORP.

ORP numbers are expected to increase as the dissolved oxygen values increase. A test series is run in which the dissolved oxygen value is varied up to 300 ppb, at pH=9.2 (caustic additions) in 205° C. water. The ORP response is shown in FIG. 6.

Figure 6:
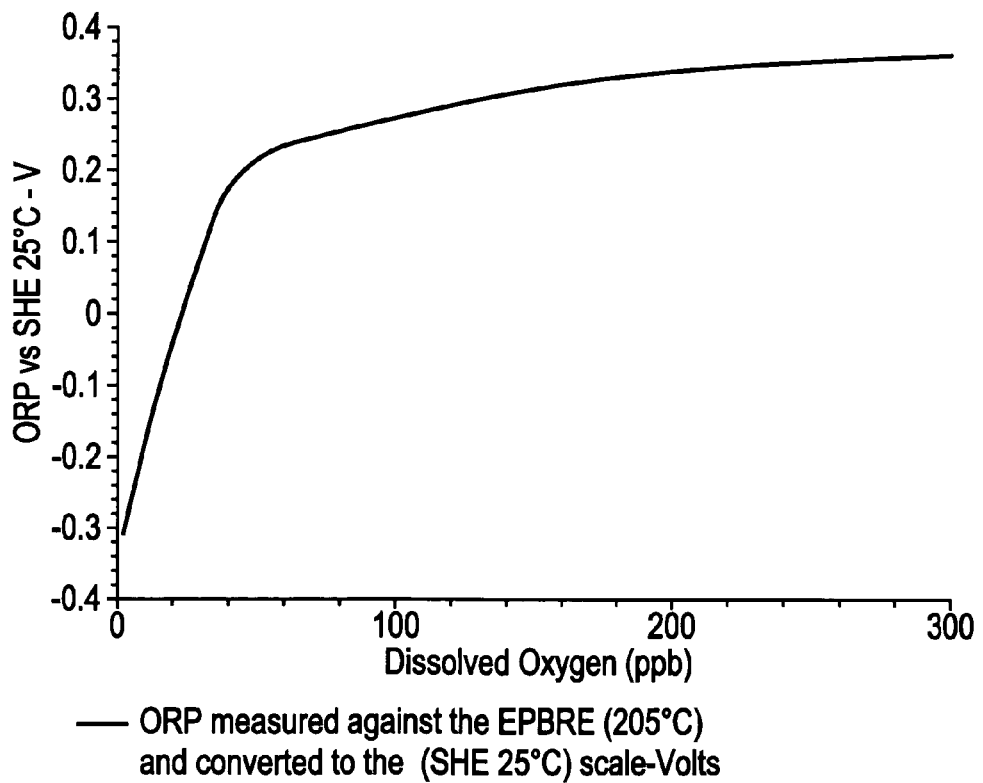
FIG. 6 is a plot of ORP (vs SHE (25° C.)(V)) against dissolved oxygen concentration (in ppb) in a deionized water stream at pH 9.2 and 205° C.

FIG. 6 shows the dissolved oxygen content on a linear scale. It is informative to see how small amounts of oxygen drastically affect the ORP numbers and how quickly the ORP numbers saturate with even higher dissolved oxygen values.

Higher temperature probes have a steeper response as compared to room temperature probes that exhibit a "flatter" response to dissolved oxygen. The high temperature ORP probe also exhibits a much larger range of response than room temperature ORP probes.

Oxygen scavengers used to inhibit corrosion in hot water systems will have varying reducing powers under the particular hot water system conditions resulting in unique reductant and oxidant equilibria. For example, ORP decreases on adding more oxygen scavenger (reductant), although the reduction in ORP becomes less and less for proportionately greater increases in scavenger. The same effect is seen for increasing dissolved oxygen.

This will in turn lead to unique ORP conditions. The ORP conditions will vary with temperature, pH and any other factors affecting ORP or the scavenger to DO kinetics and thermodynamics. Use of ORP to control reductant feed in boiler feedwater is described below.

The ORP potential of the feedwater is a function of both dissolved oxygen and oxygen scavenger concentrations (amongst other things described above). In principle by targeting a specific ORP potential in the feedwater it should be possible to feed the exact amount of scavenger required to protect a system from oxygen attack.

The key advantage of this concept is that by constantly monitoring the feedwater it is possible to take immediate corrective action when there is a system upset, thus ensuring that the boiler system is being properly chemically treated at all times. There could also be situations where excess scavenger might be fed (in the case of passivating oxygen scavengers) in order to not only control dissolved oxygen values but also to reduce system corrosion rates.

EXAMPLE 4

ON/OFF Control of Oxygen Scavenger Feed.

For this study the OPP controller used is a LMI Liquitron DR5000 series ORP controller (available from Liqui-Systems Inc., Madison, Wis.) that has the capability of running ON/OFF and pulse frequency proportional control. There is also an output for data recording of the ORP signal (4-20 mA signal). The reductant dose pump used is an LMI pump (Electronic Metering Pump A78 1-490SI). For those cases where full PID controlled feed of scavenger is attempted, a Yokogawa UT-550 controller is used.

Oxygen scavenger is either fed to the deaerator storage section via a dosing quill, or to the exit of the deaerator. When oxygen is purposefully added to the deaerated water, it is added as oxygen saturated water and the dose point is the exit of the deaerator.

Reductant (in this case oxygen scavenger) is fed based on an ORP set point. Typically a set point is set and a control range is also set, for ON/OFF control. By definition, in this control scheme the pump is either ON or OFF.

The control scheme is handled as follows. If the ORP is too high, the pump will be turned on to increase the flow of scavenger and reduce the ORP. The ORP will be reduced to the set point. As the set point is reached the pump will turn off. If it is assumed that the set point is −400 mV and the control range is 50 mV, then the pump would turn off as the ORP decreases to −400 mV. In the above example the pump will only turn back on if the ORP reading exceeds −350 mV (−400 mV+50 mV=set point+control range).

As an example sulfite is used as the added scavenger/reductant. A sulfite solution is fed into the preboiler rig with an LMI pump with a set pumping capacity of 47 ml/min. The standard rig water is deaerated, deionized water that has been pH adjusted to a pH of 9.2 by adding caustic.

Figure 7:
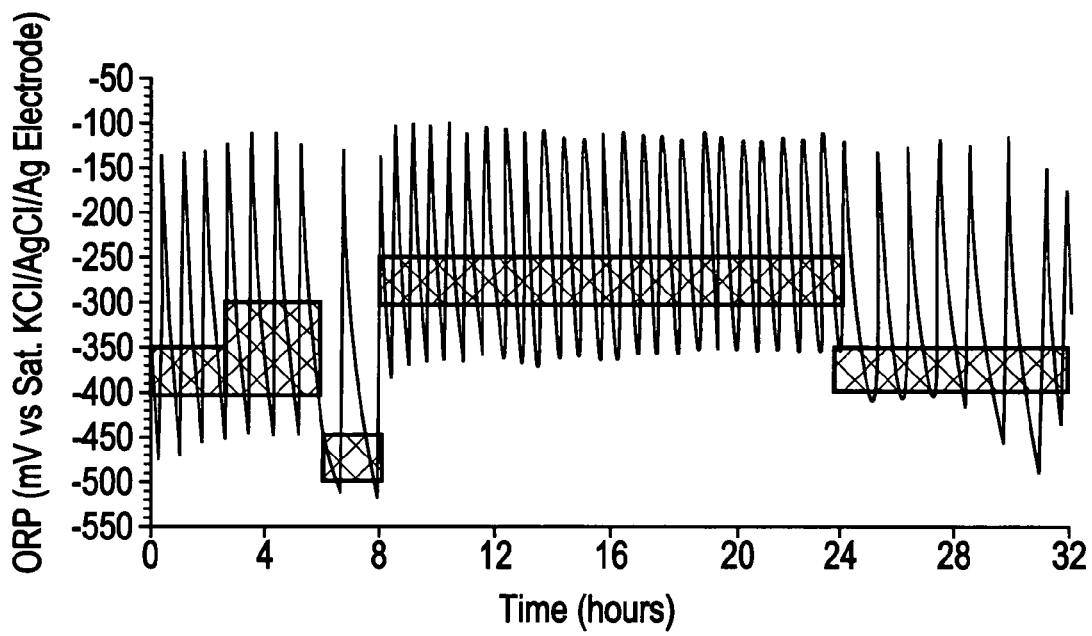
FIG. 7 is a plot of ORP (vs saturated KCl/AgCl/Ag electrode) against time during sulfite ON/OFF control tests. In this figure, the control bands are shown as crosshatched boxes.

In this case sodium sulfite, oxygen scavenger and dissolved oxygen is fed to the exit of the deaerator. The base line dissolved oxygen value would have been 140 ppb, without scavenger feed. The sulfite pump is switched on and off to try and maintain the ORP within the control boxes shown in FIG. 7.

As can be seen there are large ORP variations about the control bands, related to oxygen breakthrough followed by dissolved oxygen scavenging by sulfite. System lag times and ORP probe response leads to the above wild swings in ORP.

If the dissolved oxygen ingress event is of a shorter duration than the lag time of chemical feed then chemical injection would be performed, but would not be able to catch the DO spike and chemically 'neutralize' it. In this case, the oxygen spike would pass by the ORP probe, followed by a later ORP spike decrease as more reductant is fed and this reaches the ORP probe.

There must be a sample point where the scavenger is given enough chance to react with the dissolved oxygen. The implication is that whatever scavenger is fed, it needs to be able to reduce the ORP to the set point. Anything that interferes with this will disrupt the control philosophy. This situation might arise if sample points are only available at points where kinetically the scavenger is unable to reduce the ORP number. In this case, the dissolved oxygen values might be higher, but ORP control points are chosen so that there is sufficient reductant present to eventually scavenge the desired amount of DO further downstream.

Oxygen ingress in the deaerator will be similar to DO leaks after the deaerator, except that residence times for scavenging reactions will vary. The scavenger feed times will vary too.

When there is a large DO background the ORP control will be operating on the steep part of the ORP versus DO titration curve. Large ORP fluctuations are expected for small DO changes, especially if the lag-time is long with respect to the DO breakthrough time.

It is important to know how all the other variables that affect ORP are changing. In a computer controlled scheme the other factors could be measured and taken into account in an ORP control algorithm.

ORP variations in ON/OFF feed are going to be related to multiple things. These include:
1. The set point.
2. The control range.
3. Time between cyclic ORP variations will vary with residence times. If chemical stays in the system a long time, then the cyclic variations will be longer. In-line feed water variations will lead to shorter ON/OFF cycle times.
4. Variations in ORP will vary on the up side by the DO breakthrough and DO numbers reached before the scavenger is called into action and has a scavenging affect on the DO. Variations on the downside will vary with the concentration of the scavenger in the system after the DO inventory has been scavenged, or the DO has been decreased and there is reductant excess. The relative concentrations of oxidant and reductant are of issue here, as well as the potency of the specific reductant as a scavenger.

The amount of DO breakthrough that will occur will depend on the absolute value of the DO without the scavenger present and the time in which the system has to react with the DO and the scavenger concentrations present. It is a kinetic and thermodynamic balance that is achieved, within the system variations.

In the above testing sequence it should be pointed out that control of a worst case scenario is being attempted. There is a full, constant DO baseline, which is not expected in the field, if there is a functioning deaerator present.

Careful consideration should be given to pump limiters and alarms, so that too much scavenger is not fed to any particular system.

One application where ON/OFF control might function quite well is where there is one pump providing baseline scavenger and another pump head providing excess scavenger needed to keep ORP numbers low in 'upset' conditions. One such upset condition might be where momentarily relatively large volumes of deaerator water are 'called for' from the deaerator. This can lead to high dissolved oxygen values for short periods of time, in some systems. In these cases the ON/OFF control pump head is used as a trim pump for scavenger addition.

EXAMPLE 5

PID Control of Oxygen Scavenger Feed.

Oxygen scavenger feed may also be controlled using a PID control algorithm (or PI control algorithm is some cases). PID control stands for proportional, integral and derivative control. PID control algorithms are used in many applications, most notably heating and cooling cycles. A Yokogawa 550 PID controller is used for this study (Yokogawa, Newnan, Ga., USA).

The first step is to send the ORP probe signal to a high input impedance to low input impedance converter. This signal is then sent to the Yokogawa controller and the controller is used to drive an LMI pump to a set point.

The 4-20 mA output from the LMI ORP controller is used as input to the Yokogawa PID controller. A 4-20 mA output signal is then sent from the PID controller to the LMI pump.

Ideally the ORP signal is sent to a PID controller directly. Preferably, the PID controller includes inherent features such as alarms, pump limiters, and the like and also a data logger, data displayer, and signal provider for a feedpump.

PID parameters are preferably developed using open loop tuning. Of importance are the lag-times and the maximum rate of change of the ORP signal during normal operation. The procedure for calculating the P, I and D parameters is given below.

Initially the ORP signal is allowed to increase without any scavenger being fed. In this experiment, the ORP number is driven by a 140 ppb DO baseline condition. Once the ORP has stabilized the scavenger is fed into the system at 100% speed on the scavenger feed pump. This will correspond to the maximum feed rate of scavenger possible in the application.

Figure 8:
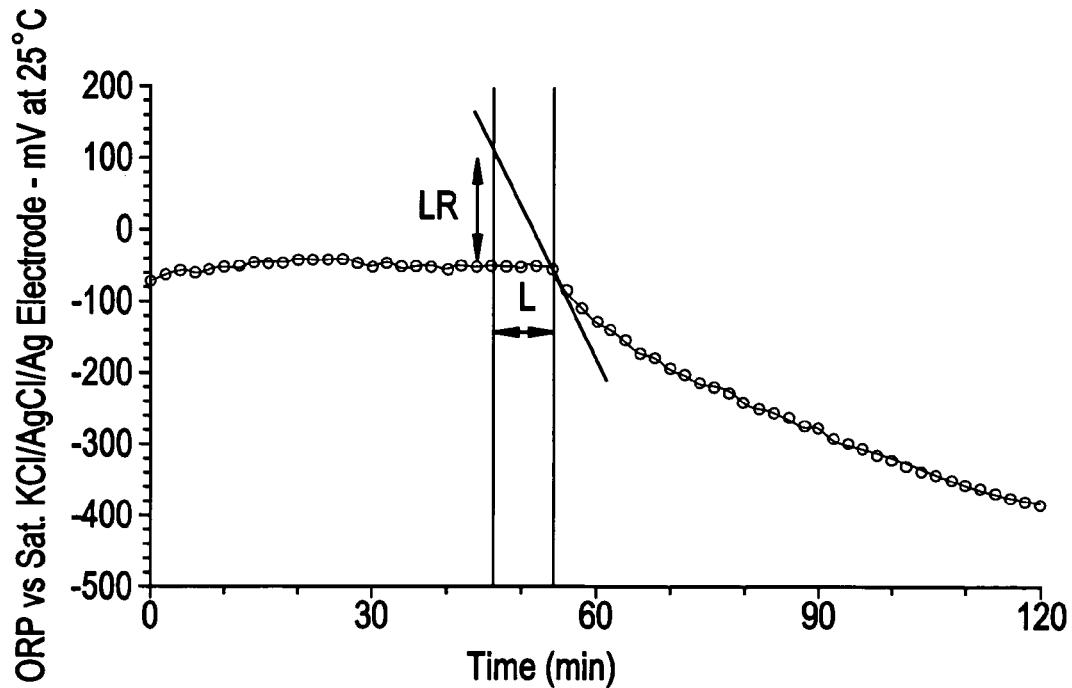
FIG. 8 is a plot of ORP (vs saturated KCl/AgCl/Ag electrode) against time for an experiment in which the open loop tuning method is used to determine PID parameters for controlling sulfite feed to a hot water system.

As shown in FIG. 8, there is a lag time "L" that transpires from the time the scavenger pump is set to 100% speed, to when the initial decline in the ORP value is seen. The distance "LR" can be constructed as shown in FIG. 8. The maximum rate of change of the ORP curve is extrapolated back to the time when the oxygen scavenger pump is turned on and set at 100%.

In the Open Loop Control scheme: P=100LR/1.25 scale (LR being given in mV and the scale being given in mV); I=2L (L in seconds); and D=0.5L (L in seconds). So D=¼I. In PID control, increasing P, decreasing D, and increasing I, make the response less sensitive.

EXAMPLE 6

PID Control of Sulfite Feed to the Deaerator.

Figure 9:
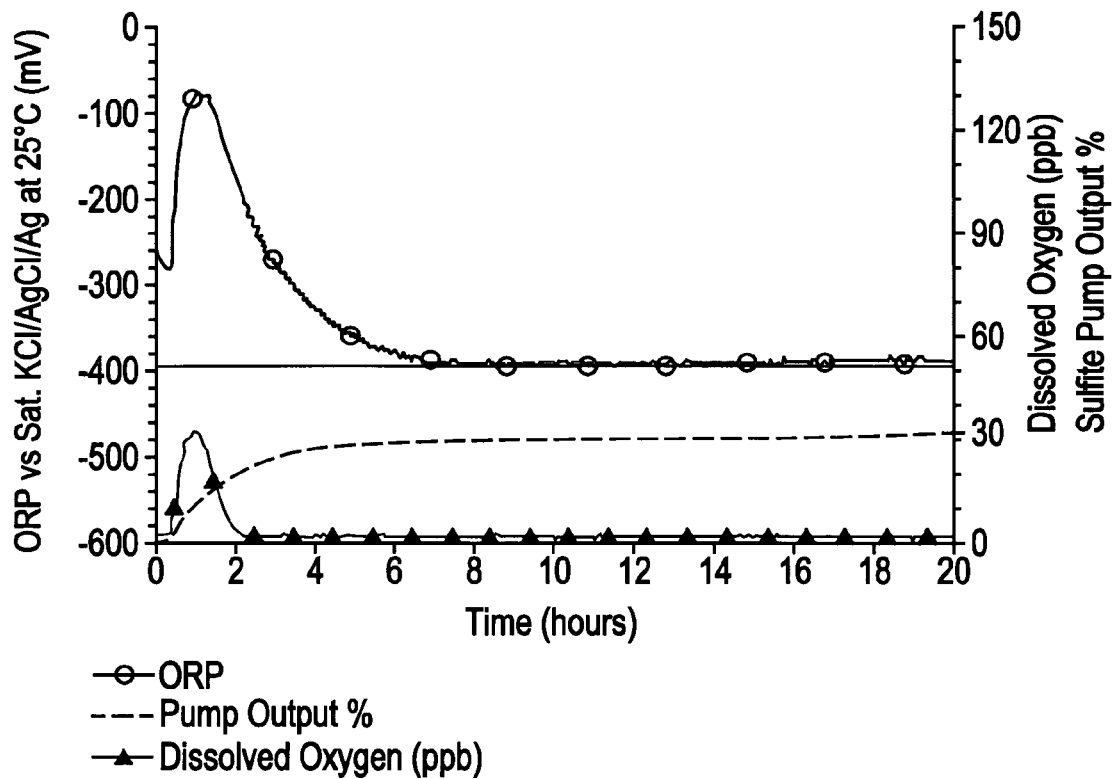
FIG. 9 is a plot of ORP (vs saturated KCl/AgCl/Ag electrode) against time for an experiment in which open loop tuning (PID (P=833, I=1612, D=403)) is used to control sulfite feed to the deaerator.

In this test sulfite is fed to the deaerator via a deaerator quill. PID parameters are calculated as P=833; I=1612; d=403 using the open loop tuning method. The ORP control point is set to −400 mV. The baseline DO value is 140 ppb achieved by pumping oxygen saturated water after the deaerator. The results from setting the PID controller with the above PID parameters and running under full PID controlled feed of scavenger are shown in FIG. 9.

As can be seen the controller gets the ORP to the set point and keeps it there. The time the controller takes to get the system to the set point is a function of many things and one of the controlling variables will be the concentration of the scavenger product. In this case the scavenger product is very dilute. Notice also that there is no overshoot in this case. This is excellent steady state control. Varying the PID parameters appropriately can increase the response time based on system variables.

EXAMPLE 7

PID Control of Sulfite Feed to the Deaerator Exit.

Figure 10:
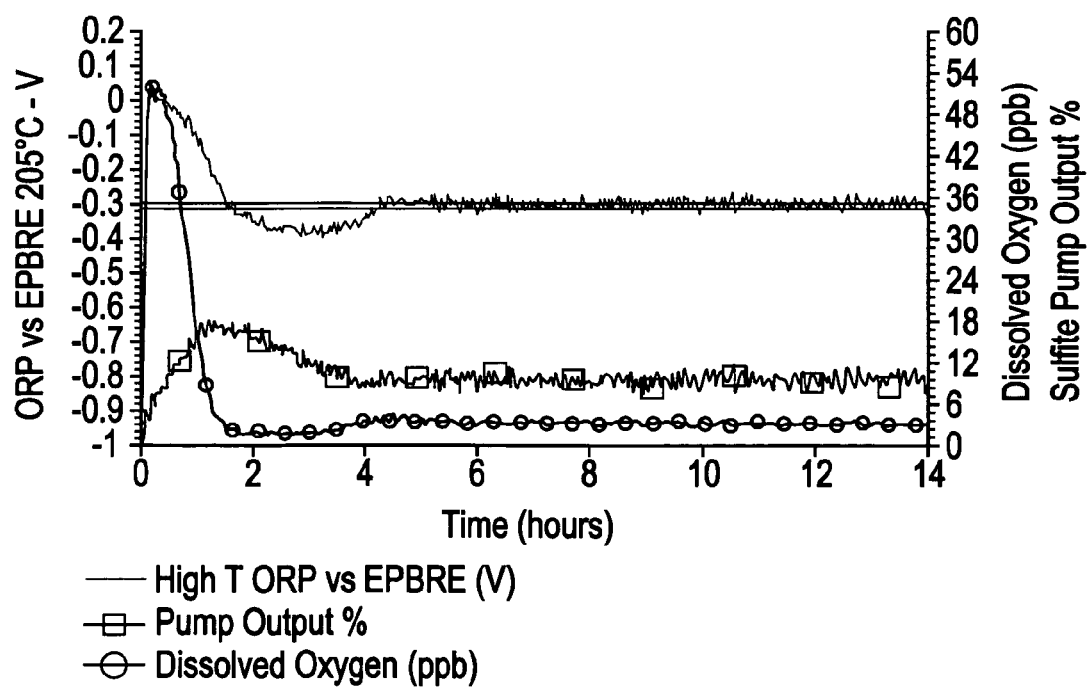
FIG. 10 is a plot of ORP (vs saturated KCl/AgCl/Ag electrode) against time for an experiment in which open loop tuning (PID (P=999.9, I=644, D=161)) is used to control sulfite feed to the deaerator exit.

PID controlled feed of sulfite to the exit of the deaerator is performed using new open loop tuning parameters. Dilute sodium sulfite solution is fed to the rig to reduce the DO baseline of 140 ppb fed at the exit of the deaerator. FIG. 10 shows the ORP control and the resulting system response. The ORP is measured at 205° C. ORP control about the set point is excellent under these demanding conditions. In this case the dissolved oxygen is knocked down within one hour. There is one cycle of ORP overshoot. In this case the pump output averaged 9.6% during the steady state phase above. This equates to almost 100% consumption of the sulfite fed.

EXAMPLE 8

Effect of Changing System Dissolved Oxygen Concentration While Feeding Sulfite to the Deaerator.

Figure 11:
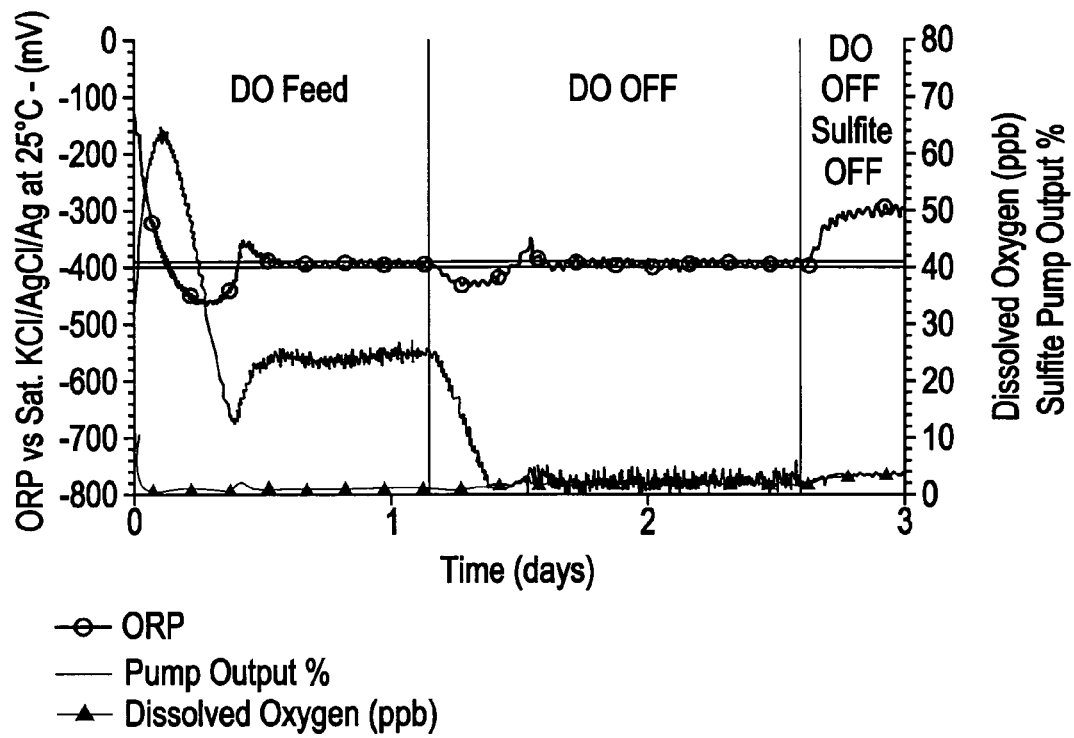
FIG. 11 is a plot of ORP (vs saturated KCl/AgCl/Ag electrode) against time for a dissolved oxygen upset experiment in which open loop tuning (PID (P=833/4, I=1612, D=403)) is used to control sulfite feed to a deaerator. The ORP set point is −400 mV.

Changing system dissolved oxygen concentration while feeding sulfite to the deaerator under PID control is described in this example. FIG. 11 shows 3 conditions tested. The three regions are marked as "DO Feed"; "DO OFF"; and "DO OFF Sulfite OFF." In the first region there is DO feed (140 ppb baseline). The supplemental DO feed is then turned off in the second region and ultimately the scavenger feed is turned off and the rig is taken out of PID control in the third region. In this case the P parameter (in the PID algorithm) is reduced from that calculated from the open loop tuning method. This increases the movement towards the set point, but creates a region of overshoot, followed by undershoot. This is typical of PID controlled systems.

As can be seen, within one cycle after making a change, the ORP control at −400 mV is achieved. With this reduced P parameter in the PID control sequence, there is one region of overshoot and one of undershoot. The sulfite feedpump is on at a speed of about 24% when DO is pumped into the system and is on at an average speed of 2.3% when there is no additional DO added to the test rig. In both cases, ORP control is achieved at −400 mV. ORP control is within 10 mV of the set point, which is exceptional control.

In the third region ORP increases above −400 mV as the system is taken out of PID control, the sulfite feed is stopped and the baseline deaerator dissolved oxygen values are achieved.

The same excellent ORP control is observed for tests in which carbohydrazide and erythorbic acid scavenger feed is added, and its expected to work for all chemistries that likewise affect ORP.

EXAMPLE 9

PID Control of Carbohydrazide Feed.

When caustic and oxygen sparged water are fed to the preboiler rig, under the current conditions, ORP numbers are on the order of +100 mV to +200 mV versus the EPBRE (T) for a 140 ppb DO environment. Feeding large carbohydrazide excesses with no DO additions drops the high T ORP to about −650 mV versus the EPBRE (T) at 205° C.

Figure 12:
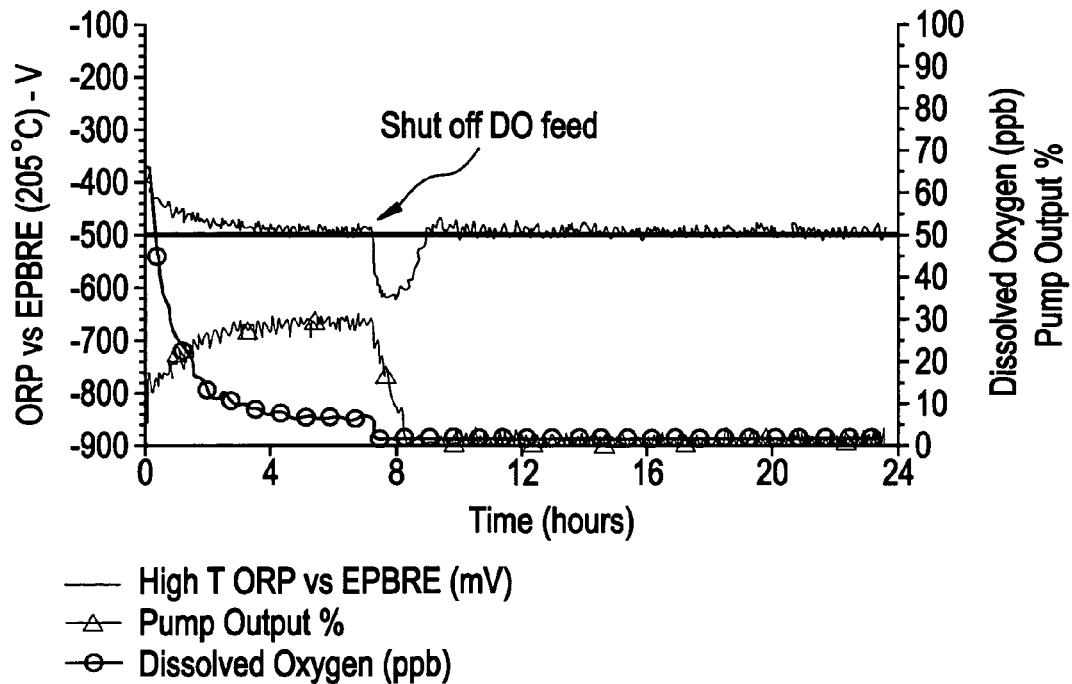
FIG. 12 is a plot of ORP (vs external pressure balanced reference electrode 0.1N KCl/AgCl/Ag electrode) against time for an experiment in which open loop tuning (PID (P=250, I=720, D=180)) is used to control carbohydrazide feed to the deaerator exit. The ORP set point is −500 mV.

During this test the additional DO feed is turned off (see FIG. 12). So there is no purposeful feed of DO to the rig other than DO brought in with the deaerated water (typically 2-4 ppb). The PID parameters used for the section of graph where no DO is purposefully fed, are as for the case when there is a 140 ppb DO baseline: P=250; I=720; D=180.

FIG. 12 shows the ORP control achieved and the resultant probe responses. ORP is controlled well at this set point with and without DO feed. As can be seen the ORP decreases as the DO is turned off. Then the carbohydrazide feed pump feeds in less carbohydrazide as required. During the stable ORP regime, after switching off the DO, the average carbohydrazide pump output drops to 0.68%. This drop is expected as less scavenger needs to be added to keep the low ORP value.

EXAMPLE 10

Selecting the ORP Setpoint.

The setpoint used in any ORP control scheme is empirically determined based on system variables including water chemistry and plant control philosophy. Decisions on control philosophy might depend on metallurgy of the engineering alloys, whether oxygenated water treatment is used, and specific plant dynamics. The chemistry constituents are going to include reductant used, temperature, pH, dissolved oxygen, etc.

The response of a system to added oxygen or oxygen scavengers and measured by ORP is dependent on multiple factors including, but not limited to oxygen scavenger dose point, ORP monitoring point, system lag times, oxygen scavenger used, the ORP probe used and the controller used including its associated parameters and tuning algorithms.

The determination of the ORP setpoint where sodium sulfite and caustic are being fed to a deionized water system is described in this example. ORP measurement is occurring at 204° C. (400° F.). In any engineering system the primary goal is to minimize the corrosion of the engineering alloys (carbon steel in this case) of the boiler feedwater. Typically there will be concern over localized pitting attack from dissolved oxygen. General corrosion rates (uniform material wastage) should also be low. In the scheme below, cyclic polarization tests (with compensation for solution resistance) are used to determine pitting potentials and ac impedance tests are used to run general corrosion rate tests.

Figure 13:
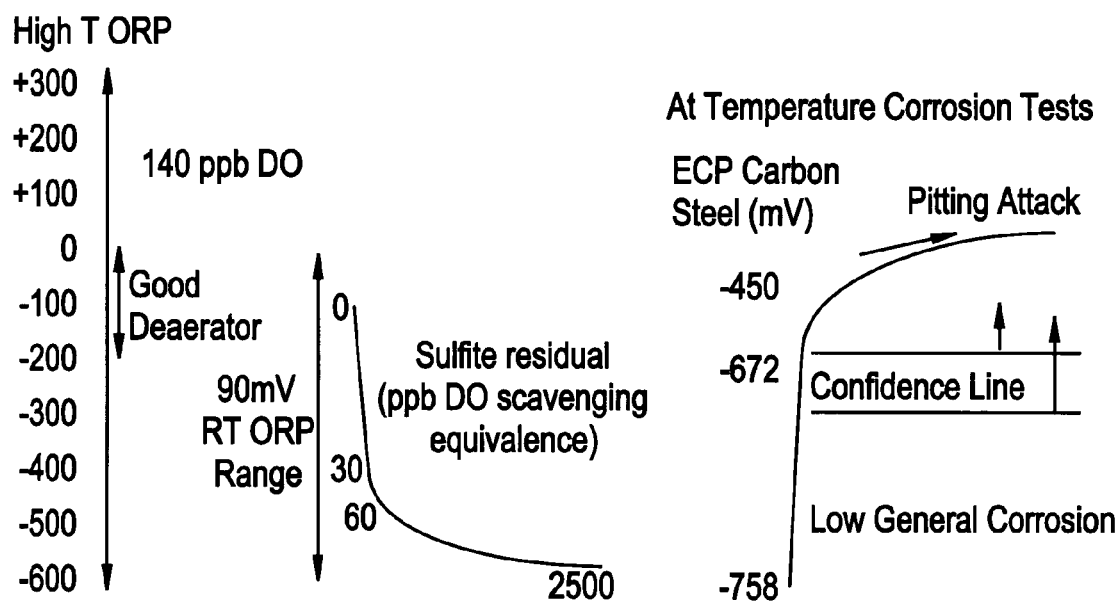
FIG. 13 is an ORP (measured against the EPBRE at 204° C.) corrosion map used to determine the ORP setpoint for optimal corrosion control in an experiment where sodium sulfite and caustic are added to the system.

Several pieces of information to be taken into account are shown in FIG. 13. First the far-left axis is a range of ORP numbers (in mV) measured at 204° C., against the EPBRE. Numbers are shown from +300 mV to −600 mV. Also shown on the axis is the approximate location of the ORP number if there is 140 ppb of dissolved oxygen in the water. The ORP range is then given if the water is sent through a good deaerator which would mechanically remove most of the dissolved oxygen, typically leaving <10 ppb dissolved oxygen in the water.

The next range of ORP numbers show that a room temperature ORP probe only exhibits 90 mV of range while the at temperature ORP probe shows 600 mV movement over the tests performed.

The next section of the graph shows the "sulfite residual (ppb DO scavenging equivalence)", with numbers ranging from 0 to 2500. This graph shows how the ORP, in good deaerated water, will vary as the amount of sulfite is increased. In this case the pH of the water is 9.2 (achieved with caustic additions). So, for example, an ORP of −500 mV would be measured if enough sulfite is added to provide an excess sulfite concentration able to scavenge an additional 60 ppb of DO. As can be seen as the amount of reductant excess increases, then the ORP number decreases. This is expected.

The final part of the figure provides a corrosion map for the corrosion performance of carbon steel in this sulfite and caustic environment. The ECP (freely corroding electrochemical potentials) for carbon steel are shown for the equivalent ORP numbers. It is found that if the corrosion potentials are above −672 mV (versus the EPBRE) then carbon steel will pit and pitting attack becomes worse for high potentials. That is pits that will form will autocatalytically propagate. As such an arbitrary "Confidence Line" for pitting has been drawn about 100 mV below the −672 mV line. This implies that the system should be operated below this line so that there is no chance of pitting to occur. The final part to the 'puzzle' is the zone shown as "Low General Corrosion". Here it is found that the corrosion rates for carbon steel are the lowest. In this case about 0.2 mpy (milli inches per year) or about 5 micron per year.

Therefore, in this case, if the ORP control is set up to obtain low carbon steel corrosion rates, in this boiler feedwater system, then an ORP set point of less than −400 mV would be appropriate with a setpoint of less than −500 mV being even better.

The corrosion potential of carbon steel itself cannot be used to control scavenger feed as the ECP numbers respond too slowly for scavenger feed control in dynamic systems. There are also problems with issues of electrode polarization.

Any ORP based control package can be developed using the method and apparatus described herein. This includes hardware and software. The first units might be as simple as only ORP monitoring tools, to be followed by ORP control tools, followed by integrated ORP, pH, temperature tools for full automated ORP based controlled feed of reductants. The final tools being smart devices that would detect an ORP upset and might ascribe the upset to a pH control problem and not an oxidant/reductant equilibria change. Such a system might not adjust a scavenger feed pump. Such a system might be intelligent enough to adjust the scavenger dose pump knowing that the scavenger to oxygen reaction is affected by pH. The ORP control point might thus vary to optimize scavenging. In a more complicated system the implied corrosion implications could also be taken into account to adjust ORP to a set point that would provide a low corrosion response. Corrosion information could be locally generated or inferred from laboratory data.

Using the apparatus and methods described above, we have determined that effective corrosion control in an industrial boiler system can be preferably realized by adding oxygen scavenger to the system such that the ORP, as measured at temperature and pressure, is maintained in a range of from about −0.7 V to about −0.3 V at 400° F. vs silver/silver chloride external pressure balanced reference electrode.

In an aspect, the oxygen scavenger is added to the industrial boiler feed water and condensate system.

For an all carbon steel feed water and condensate system having a pH of about 8 to about 10 where sodium sulfite is employed as the oxygen scavenger, effective corrosion control is preferably achieved by maintaining the ORP in a range of from about −0.65 V to about −0.5 V at 400° F. vs silver/silver chloride external pressure balanced reference electrode (0.1N KCl filling solution).

For an all carbon steel feed water and condensate system having a pH of about 8 to about 10 where carbohydrazide is employed as the oxygen scavenger, effective corrosion control is preferably achieved by maintaining the ORP in a range of from about −0.6 V to about −0.45 V at 400° F. vs silver/silver chloride external pressure balanced reference electrode (0.1N KCl filling solution).

For an all carbon steel feed water and condensate system having a pH of about 8 to about 10 where erythorbic acid is employed as the oxygen scavenger, effective corrosion control is preferably achieved by maintaining the range of ORP at from about −0.6 V to about −0.35 V at 400° F. vs silver/silver chloride external pressure balanced reference electrode (0.1N KCl filling solution).

For a mixed metallurgy feed water and condensate system containing copper and having a pH of about 8 to about 10, oxygen scavenger is preferably added to maintain the range of ORP at from about −0.65 V to about −0.5 V at 400° F. vs silver/silver chloride external pressure balanced reference electrode (0.1N KCl filling solution). Adjusting the pH to about 8.8 to about 9.2 will lower copper corrosion rates.

In an all ferrous industrial boiler system that meets the chemistry requirements of oxygenated water treatment, effective corrosion control is preferably accomplished by adding oxygen to the system such that the ORP is maintained in a range of from about 0 V to about 0.3 V at 400° F. vs silver/silver chloride external pressure balanced reference electrode (0.1N KCl filling solution).

Oxygen scavengers are typically delivered to hot water systems in liquid form. Scavengers are feed to the hot water system after some mechanical deaeration has occurred, although sometimes sulfite is added to systems with poor to no deaeration. Best practices dictate that scavengers are fed to the deaerator storage section or hot water storage tank. Here the water has already undergone mechanical deaeration and the chemical oxygen scavenger is given time to react with the remaining dissolved oxygen prior to being called for as boiler feedwater. Scavengers can however also be fed to the boiler feedwater line itself and to condensate regions.

The oxygen scavengers may be used in combination with other chemistries that are routinely added to hot water systems. These include chemicals to reduce scaling and prevent corrosion of the engineering alloys used in the manufacture of boilers. Such chemistries include (but are not limited to) phosphates, phosphonates, chelants, polymers, amines, filmers, antifoams, pH control agents and the like. Multifunctional products can be pre-blended or added individually to a boiler system.

Changes can be made in the composition, operation and arrangement of the method of the invention described herein without departing from the concept and scope of the invention as defined in the claims.

The invention claimed is:

1. A method of maintaining an effective corrosion-inhibiting amount of oxygen scavenger or oxygen in a hot water system comprising
   (i) determining range of oxidation-reduction potentials for effective corrosion inhibition for the system at system temperature, pressure and pH;
   (ii) measuring the oxidation-reduction potential of the feed water in the system at operating temperature and pressure; and (iii) adding oxygen or oxygen scavenger to the system to maintain the oxidation-reduction potential of the feedwater in the system within the predetermined range of oxidation-reduction potentials.

2. The method of claim 1 wherein the hot water system is an industrial boiler system.

3. The method of claim 2 wherein an oxygen scavenger is added to the hot water system.

4. The method of claim 3 wherein the oxygen scavenger is selected from the group consisting of hydrazine, sodium sulfite, carbohyrazide, N,N-diethyihydroxylamine, hydroquinone, erythorbate, methyl ethyl ketoxime, hydroxylamine, and gallic acid.

5. A method of inhibiting corrosion of the metal surfaces of a hot water system comprising
   (i) adding an effective corrosion inhibiting amount of oxygen or one or more oxygen scavengers to the system;
   (ii) measuring the oxidation-reduction potential of the feed water in the system at operating temperature and pressure; and
   (iii) adding oxygen or oxygen scavenger to the system to maintain the effective amount of oxygen or oxygen scavengers in the system based on the measured oxidation-reduction potential of the water.

6. The method of claim 5 wherein the measuring of oxidation-reduction potentials and addition of oxygen or oxygen scavengers is performed continuously.

7. The method of claim 5 wherein the measuring of oxidation-reduction potentials and addition of oxygen or oxygen scavengers is performed intermittently.

8. A method of inhibiting corrosion of the metal surfaces of a hot water system comprising
   (i) determining range of oxidation-reduction potentials for effective corrosion inhibition for the system at system temperature, pressure and pH;
   (ii) adding oxygen or one or more oxygen scavengers to the system to bring the system oxidation-reduction potential within the predetermined range;
   (iii) continuously or intermittently measuring the oxidation-reduction potential of the feed water in the system at operating temperature and pressure; and
   (iv) adding oxygen or oxygen scavengers to maintain the measured system oxidation-reduction potential within the predetermined range.

* * * * *